United States Patent [19]
Kawasaki

[11] Patent Number: 5,323,234
[45] Date of Patent: Jun. 21, 1994

[54] PROGRAMMABLE CATV SYSTEM AND TERMINAL UNIT THEREFOR

[75] Inventor: Masahiko Kawasaki, Tokyo, Japan

[73] Assignee: Pioneer Electronic Corporation, Tokyo, Japan

[21] Appl. No.: 428,724

[22] Filed: Oct. 30, 1989

[30] Foreign Application Priority Data

Apr. 4, 1989 [JP] Japan ................. 1-83935

[51] Int. Cl.⁵ ............................... H04N 7/10
[52] U.S. Cl. ........................ 348/6; 455/4.2; 455/6.2
[58] Field of Search ............ 358/86, 142; 455/3, 455/4, 5, 6, 3.1, 4.2, 5.1, 6.2

[56] References Cited

U.S. PATENT DOCUMENTS

| | | | |
|---|---|---|---|
| 4,381,522 | 4/1983 | Lambert | 455/5 |
| 4,439,784 | 3/1984 | Furukawa et al. | 358/86 |
| 4,567,512 | 1/1986 | Abraham | 358/86 |
| 4,694,490 | 9/1987 | Harvey et al. | 380/20 |
| 4,706,121 | 11/1987 | Young | 358/142 |
| 4,716,410 | 12/1987 | Mozaki | 358/86 |
| 4,797,918 | 1/1989 | Lee et al. | 358/86 |
| 4,890,320 | 12/1989 | Monslow et al. | 455/5 |

OTHER PUBLICATIONS

"Trial For Bar Code VCR Systems Begins" Mar. 1988 p. 55, Screen Digest.
"New Zealand-News Media Introduces Software T Listings Into Bar Codes" Jun. 18, 1987, p. 1, Wall Street Journal.

Primary Examiner—Edward F. Urban
Attorney, Agent, or Firm—Sughrue, Mion, Zinn, Macpeak & Seas

[57] ABSTRACT

A CATV head end, terminal unit, and system permits time reservation of selected programs by the simple process of entering a program number at the terminal unit. At the head end selected programs are transmitted via cable to the terminal units and include a timer start command located at the start of a program, and a timer end command located at the end of a program. The commands identify the program by a program number, and the start command also identifies the channel on which the program is transmitted. At the terminal unit, the received commands are compared with the program number entered at the terminal unit. If the program numbers match, the power is turned on and the channel is selected, for a start command, or the power is turned off, for an end command.

8 Claims, 3 Drawing Sheets

| CHANNEL | TIME | 13 (MONDAY) || 14 (TUESDAY) ||
|---|---|---|---|---|---|
| | | TITLE OF PROGRAM | PROGRAM NUMBER | TITLE OF PROGRAM | PROGRAM NUMBER |
| 15 | 19:00 | NEWS | 151319 | CARTOON | 151419 |
| | 20:00 | DRAMA | 151320 | FOREIGN MOVIE | 151420 |
| | 22:00 | SPORT | 151322 | | |
| 16 | 19:00 | BASEBALL | 161319 | NEWS | 161419 |
| | 21:00 | DOMESTIC MOVIE | 161321 | MUSIC | 161421 |
| | 23:00 | NEWS | 161323 | CNN | 161423 |

FIG. 2

| TIMER START COMMAND ID CODE | PROGRAM NUMBER | CHANNEL NUMBER |

FIG. 3

| TIMER END COMMAND ID CODE | PROGRAM NUMBER |

FIG. 5

| CHANNEL | TIME | 13 (MONDAY) | | 14 (TUESDAY) | |
|---------|------|-------------------|----------------|-------------------|----------------|
|         |      | TITLE OF PROGRAM  | PROGRAM NUMBER | TITLE OF PROGRAM  | PROGRAM NUMBER |
| 15      | 19:00 | NEWS | 151319 | CARTOON | 151419 |
|         | 20:00 | DRAMA | 151320 | FOREIGN MOVIE | 151420 |
|         | 22:00 | SPORT | 151322 | | |
| 16      | 19:00 | BASEBALL | 161319 | NEWS | 161419 |
|         | 21:00 | DOMESTIC MOVIE | 161321 | MUSIC | 161421 |
|         | 23:00 | NEWS | 161323 | CNN | 161423 |

PROGRAMMABLE CATV SYSTEM AND TERMINAL UNIT THEREFOR

BACKGROUND OF THE INVENTION

This invention relates to a CATV system and a CATV terminal unit for use therein, comprising a head end (center) which re-transmits broadcast waves of existing stations or transmits independently produced programs and a number of terminal units connected to the center via cables.

Conventionally, a center (head end) apparatus in the CATV system of this type comprises a VHF antenna, a UHF antenna, and a BS antenna for receiving broadcast waves of existing stations. The broadcasting signals received by these antennas are respectively processed and mixed before being transmitted via a transmission line, e.g., a coaxial cable.

The center apparatus also comprises sources for independently produced original programs, such sources including a video camera, a video cassette recorder (VCR) or the like. The system selects such sources for transmission of the produced signals via the cable.

The center apparatus determines, according to a broadcasting schedule of programs, from which source the signal is obtained, modulates a TV signal from the selected source to have a specific channel frequency, and mixes the TV signal with other signals before transmitting them via the transmission line.

Further, the center apparatus transmits data, such as a channel and permission or prohibition for receiving a specific program, to a subscriber terminal unit in the form of an FSK signal on a channel prepared in advance.

On the other hand, each CATV terminal unit has an address unique to itself, by which only the terminal unit belonging to a subscriber having a contract to receive chargeable programs is allowed to receive the chargeable programs. Such a terminal unit selects a desired signal from signals transmitted via the transmission line, descrambles the selected signal if the selected signal carries a chargeable program and was scrambled by the center apparatus, and modulates the descrambled signal to have a specific channel frequency of a television receiver, e.g., channel 3 or channel 4, before outputting the signal. The FSK signal transmitted as out-of-band data from the center apparatus is subjected to a predetermined process and then is used to generate a control signal for a control of a descrambling operation.

The CATV terminal unit further comprises an input unit provided in the main body and a remote control unit separately supplied as an input unit. Operation of either input unit activates execution of channel selection, setting operation of a timer (a time at which the terminal unit power is turned on), or the like.

In the above-mentioned general arrangement of a CATV system, the timer function of the CATV terminal unit may sometimes be used as a VCR recording timer, an alarm timer, or a sleep timer.

In the above-mentioned CATV system and CATV terminal unit therefor, when the subscriber uses the timer function of the terminal unit to reserve a program, it is necessary to input such data as the channel number of the program, the date, the turning-on time, and the turning-off time. This is a cumbersome operation involving a number of steps.

On the other hand, the actual broadcasting time of a "realtime" program such as a sporting event or other live programming may be subject to change due to a change of the start time or end time of the event. If a timer reservation has been set to such a program, but the actual starting or ending time is different from what was scheduled, it may occur that the timer-on function will be activated when the reserved program has not yet started. In this case, the subscriber typically waits before the TV receiver for the reserved program to start. Alternatively, it may occur that a part of the program will be missed because of the difference between the times selected by the timer unit and the actual broadcast time of the program.

SUMMARY OF THE INVENTION

The present invention is intended to provide a solution to the above problems. An object of the invention is to provide a CATV system and a CATV terminal unit therefor which allows the operation for timer reservation of a program to be relatively simple and which ensures that a reserved program will be received even when the broadcasting time of the reserved program has changed.

To solve the above problems, a CATV system according to this invention comprises a center apparatus which transmits a program and data specifying the program and the program channel at the start of each program; and a CATV terminal unit having the capability of reserving a program and being connected to the center apparatus via a transmission line. The CATV terminal unit comprises memory means for storing data representing a reserved program, which data is input at the time of reserving a program; and control means for comparing the data from the center apparatus with the data stored in the memory means, determining the start of the reserved program based on the result of the comparison, and controlling the reception of the reserved program.

The CATV terminal unit receives the program and the data specifying the program and the channel of the program from the center apparatus at the start of the program, and comprises input means for inputting data specifying a reserved program; memory means for storing the data input from the input means; and control means for comparing the received data with the data stored in the memory means, determining the start of the reserved program based on the result of the comparison, and controlling the reception of the reserved program.

BRIEF DESCRIPTION OF THE DRAWINGS

FIGS. 2 and 3 are drawings showing examples of a timer start command and a timer end command, respectively, transmitted from the center apparatus of FIG. 1;

FIG. 5 is a drawing showing an example of the CATV program list to be used in conjunction with this invention.

DETAILED DESCRIPTION OF THE PREFERRED EMBODIMENT

There now follows a description of embodiments according to this invention with reference to the drawings.

Figure 1:
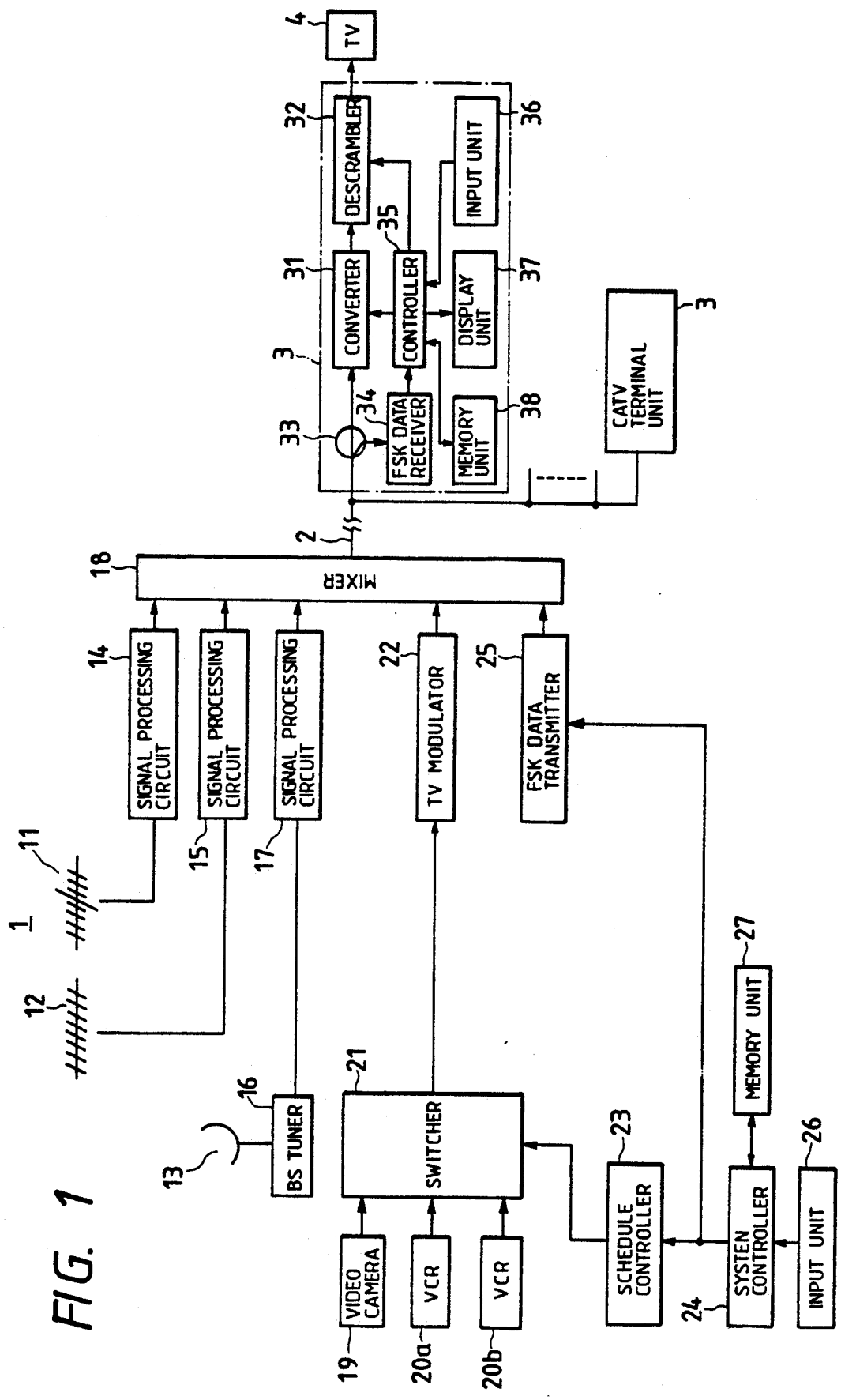
FIG. 1 is a block diagram showing an embodiment of a CATV system according to this invention.

FIG. 1 is a block diagram showing an embodiment of the CATV system according to this invention. The CATV system shown in the figure comprises a center (head end) apparatus 1, a transmission line 2, e.g., a coaxial cable, and a number of CATV terminal units 3 connected to the center apparatus 1 via the transmission line 2.

Center apparatus

The center apparatus 1 comprises a VHF antenna 11, a UHF antenna 12, and a BS antenna 13, each of which receives broadcasting signals from existing broadcasting stations. The broadcasting signals received by the VHF antenna 11 and UHF antenna 12 are supplied to respective signal processing circuits 14 and 15, while a broadcasting signal received by the BS antenna 13 is supplied to a signal processing circuit 17 via a BS tuner 16. The signal processing circuits 14, 15 and 17 process the broadcasting signals received by the corresponding antennas 11 to 13, and these broadcasting signals processed by the signal processing circuits 14, 15 and 17 are mixed by a mixer 18, and then transmitted by the CATV terminal units 3 via the transmission line 2.

The center apparatus 1 also comprises, as signal sources for broadcasting independently produced programs, a video camera 19, video cassette recorders (VCR) 20a and 20b. The latter signal sources are connected to a switching means or switcher 21, which selects a signal source and transmits a TV signal from the selected signal source to a TV modulator 22. The TV modulator 22 converts the video signal from the selected video source to a specific channel frequency and supplies the frequency-converted video signal to the mixer 18.

The switcher 21 is controlled according to a program broadcasting schedule by a system controller 24 via a schedule controller 23. Namely, a specific signal source is selected by the schedule controller 23 which switches the switcher 21 under the control of the system controller 24. To this end, the schedule controller 23 transmits data from the system controller 24 to the switcher 21 according to the program broadcasting schedule and causes the switcher 21 to select from among the several signal sources, the one which will be connected to the TV modulator 22. The TV signal from the signal source selected by the switcher 21 is modulated to have a specific channel frequency by the TV modulator 22 and mixed with other signals by the mixer 18 before being transmitted via the transmission line 2.

Furthermore, the system controller 24 automatically outputs timer commands of such formats as shown in FIGS. 2 and 3 at the start and end times of the program broadcast. Additionally, the controller 24 outputs data representing the channel of the broadcast and permission or prohibition data designating whether terminal units are permitted to descramble the program. The channel permission and prohibition data is the same as is conventionally provided in CATV systems with chargeable programming. The latter data and the former timer commands are transmitted on a channel prepared in advance via an FSK data transmitter 25 and the mixer 18. The timer command to be transmitted at the start of broadcasting consists of a timer start command ID code, a program number, and a channel number, as shown in FIG. 2, while the timer command to be transmitted at the end of broadcasting consists of a timer end command ID code and a program number, as shown in FIG. 3.

An input unit 26, comprising, e.g., a keyboard, and a memory unit 27 comprising, e.g., a RAM and a ROM, are connected to the system controller 24. The input unit 26 is used by an operator to input program broadcasting schedule data and to select either an automatic mode for making a fully automatic selection of the signal source in the center apparatus 1 according to the program broadcasting schedule or a manual mode for making a switching selection. The memory unit 27 comprises a ROM for storing a control program of a CPU in the system controller 24, and a RAM for storing data such as a program broadcasting schedule received from the input unit 26. The data stored in the RAM of this memory unit 27 is read by the system controller 24, and used, e.g., to automatically switch between broadcasting programs or to transmit the timer command data.

The above-mentioned manual mode is used when the function of the system controller 24 to automatically transmit the timer command as programmed is stopped. In this mode, the operator can freely transmit the timer command when the program is extended or starts later than scheduled.

CATV Terminal Unit 3

The CATV terminal unit 3 includes a timer reservation function such as a VCR recording timer, an alarm timer, or a sleep timer. The terminal unit 3 comprises a converter 31 for selecting a desired signal from the number of broadcasting signals which are transmitted via the transmission line 2 and frequency-converts the selected signal; and a descrambler 32 for descrambling a signal selected by the converter 31 if the selected channel carries a chargeable program and the signal of the program is scrambled by the center apparatus 1. The descrambled signal is frequency adjusted to be on a specific channel of a television receiver 4, e.g., channel 3 or channel 4.

In addition to the above, the CATV terminal unit 3 comprises a branching device 33 for branching a part of the broadcasting signal at the upstream stage of the converter 31 to obtain the FSK signal transmitted as out-band data from the center apparatus 1; an FSK data receiver 34 for separating the FSK signal from the broadcasting signal branched by the distributor 33; and a controller 35, consisting, e.g., of a CPU, to which the FSK signal obtained by the FSK data receiver 34 is supplied.

The controller 35 comprises a keyboard provided in the main body and a separately supplied remote control unit. Units connected to the controller 35 include an input unit 36 which is operated by a subscriber to input a command such as a turn command or a channel selection command; a display unit 37 for displaying the input command data input by the input unit 36; and a memory unit 38. The memory unit 38 comprises a ROM for storing a control program for the controller 35 and a RAM for storing data such as the command data input by the input unit 36 and the data transmitted as the FSK signal from the center apparatus 1.

Operation of the Terminal Unit

To time reserve a program for timer recording or timer watching, the CATV terminal unit 3 is operated by inputting a program number, indicated on the program list distributed to the subscriber, in advance of the broadcast of the program using function keys or ten keys of the input unit 36. For example, to input a program number 1234, it is only required that a "timer"

key, ten keys "1", "2", "3", "4" and a "setting" key be operated. When the program number "1234" has been input by this key operation on the input unit 36, this program number is stored in a predetermined area in the RAM of the memory unit 38 after being converted to a corresponding code for a purpose of later comparison with program number data transmitted from the center apparatus 1.

When a timer start command (FIG. 2) is received from the center apparatus 1, the controller 35 compares the program number in this timer start command with the program number stored in the RAM of the memory unit 38 by the timer reservation and judges whether or not the two program numbers are identical. If they are identical, the controller turns on the main power of the terminal unit 3, stores the received channel number in a predetermined area of the RAM, and based on the channel number, generates tuning data, such as a dividing ratio data of a PLL, to select the appropriate channel whose channel number is included in the timer start command, and provides this data to the converter 31. It will be appreciated that the predetermined storage area in storage unit 38, is an area which represents the current channel number. That stored number controls the controller to generate the necessary inputs to the converter so the converter will select the channel corresponding to the channel number stored in the predetermined area. At the time a time unit start command is received, and if the program number received matches the stored program number, the received channel number will replace the previously held channel number stored in said predetermined area. The latter channel number will be stored in another location until the timer reserved program is finished, at which time the said previous channel number will be again stored in the predetermined location.

Upon receipt of a timer end command (FIG. 3) by the CATV terminal unit 3, the controller 35 compares the program number stored in the RAM of the memory unit 38 with the program number in the timer end command. If the two numbers are identical, the controller 35 erases the channel number stored in said predetermined area of the RAM and causes the storing unit 38 to store in the same area the channel number which was previously saved in another location of the memory. This returns the CATV terminal unit 3 to the state before the receipt of the timer start command. The controller then turns off the main power of the terminal unit 3 to complete a series of operations associated with the timer reservation.

Detailed Operation

Figure 4:
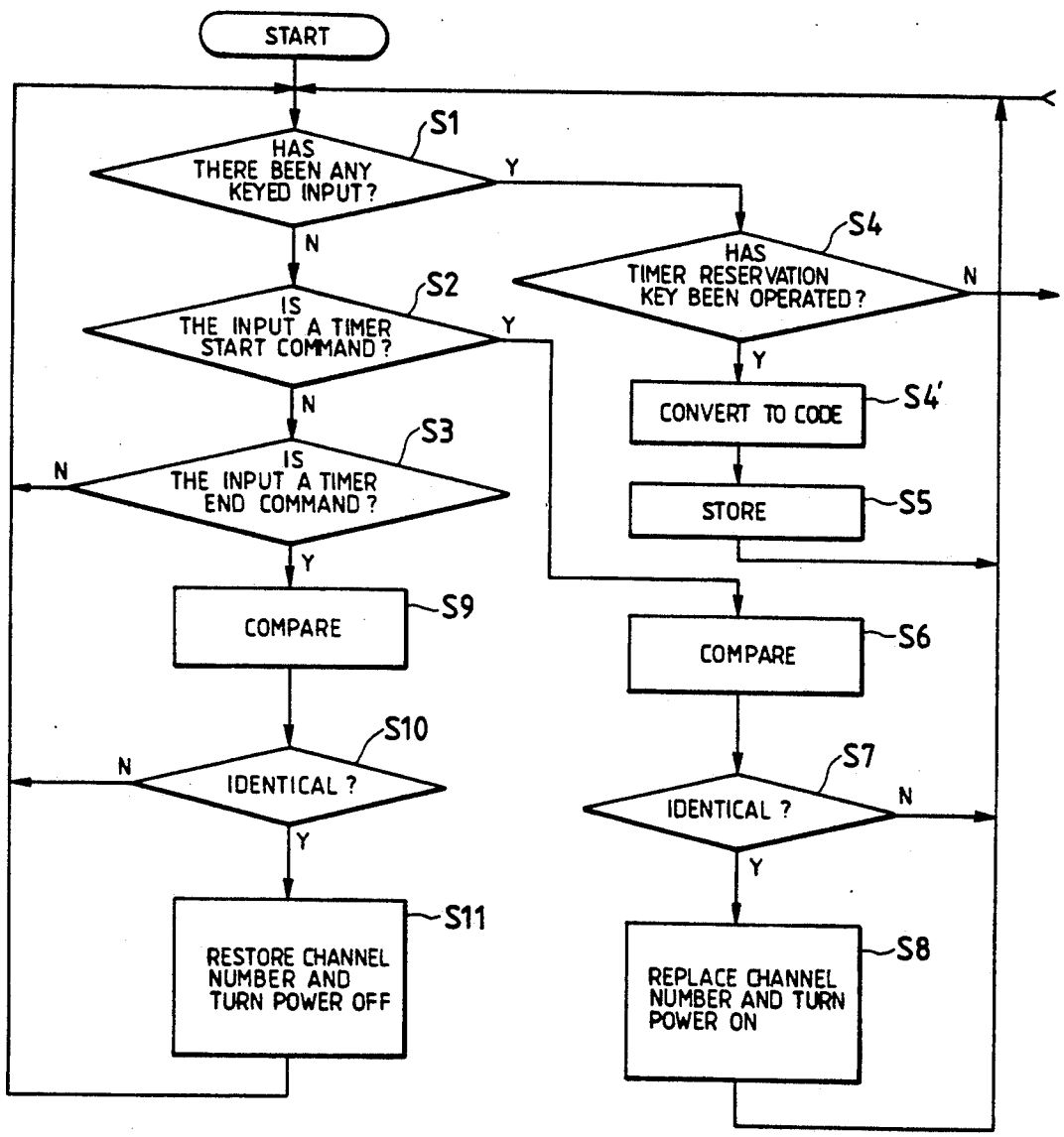
FIG. 4 is a flowchart of the operations performed by the controller of the CATV terminal unit of FIG. 1.

The operation of the CATV terminal unit 3 will now be described in detail with reference to the flowchart in FIG. 4 showing the job to be performed by the CPU in the controller 35 of the CATV terminal unit 3 according to a predetermined program.

The flowchart indicates an operation of the CPU which starts with the turning on of the standby power for the CPU. In step S1 a determination is made as to whether there is a keyed input from the input unit 36. If there is no keyed input, the CPU proceeds to step S2, where it is determined, based on a signal from the FSK data receiver 34, whether or not a timer start command has been received from the center apparatus 1. If no timer start command has been received, the CPU proceeds to step S3, where it is determined whether or not a timer end command has been received. If the judgment in S3 is NO, the CPU returns to step S1 to repeat the above steps.

If there is a keyed input from the input unit 36, the judgment in S1 is YES, and the CPU proceeds to step S4, where it is determined whether or not the keyed input is related to a timer reservation, i.e., whether there has been a series of inputs starting with the "timer" key and ending with the "setting" key. If the judgment is NO, the CPU proceeds to another keyed input judgment step (not shown) not related to the present invention. If the judgment in step S4 is YES, i.e., the keyed input is related to a timer reservation, the CPU proceeds to step S4', where the program number keyed in is converted to a code representing the program number, and the CPU further proceeds to step S5. In step S5 the CPU causes the memory unit 38 to store in the RAM the program number input by the keyed input from the input unit 36, and returns to step S1.

On the other hand, if the judgment of step S2 is YES, i.e., the timer start command has been received from the center apparatus 1, the CPU proceeds to step S6, where it compares the program number in the timer start command (FIG. 2) with the program number stored in the RAM of the memory unit 38, and further proceeds to step S7 to determine whether or not the two program numbers are identical. If the judgment in step S7 is NO, i.e., there is no program number stored in the RAM of the memory unit 38 which is identical with the program number in the timer start command, the CPU returns to step S1 and repeats the above-mentioned steps.

If the judgment in step S7 is YES, i.e., the program number identical with the program number in the timer start command has been stored in the RAM of the memory unit 38, the CPU proceeds to step S8. In step S8 the channel number stored in a predetermined area in the RAM of the memory unit 38 which stores the current channel number is saved in another part of the memory unit, and the channel number in the timer start command is stored in the predetermined area of the RAM. Also in step S8, the main power of the terminal unit 3 is turned on, and the operation returns to step S1 to repeat the above mentioned operation.

Upon execution of the above step S8, the tuning data for selecting a channel based on the channel number included in the timer start command, such as division ratio data of the PLL, is transmitted to the converter 31, and the channel of the desired program is selected.

If the determination in step S3 is YES, i.e., the timer end command has been received, the CPU proceeds to step S9, where it compares the program number in the timer end command (FIG. 3) with the program number stored in the RAM of the memory unit 38, and further proceeds to step S10 to determine whether or not the two program numbers are identical. If the determination in step S10 is NO, i.e., there is no program number stored in the RAM of the memory unit 38 which is identical with the program number in the timer end command, the CPU returns to step S1 with this end command regarded as an end command for another program.

If the determination in step S10 is YES, i.e., the program number identical with the program number in the timer end command has been stored in the RAM of the memory unit 38, the CPU proceeds to step S11, where it erases the channel number stored in the predetermined area in the RAM of the memory unit 38 which stores the current channel number, and causes the memory unit 38 to store in the same area the channel number which was previously saved in step S8. The CPU then turns the power off and returns to step S1 and completes a series of operations associated with the timer reservation.

Modified Embodiment

In the above embodiment the timer start command has distinct program numbers and channel numbers. However, if the program numbers are defined as including respective channel numbers, as shown in FIG. 5, separate channel numbers need not be included in the timer start command. However, it will be appreciated that whether or not a separate channel number is included in the start command, the information about the channel will be included in the start command. Moreover, only one timer command is needed, if a number which is not used as a program number, e.g., "999999", is defined and used as the timer end command ID code.

As described above, the present invention not only allows the program reservation operation to be simple but also ensures that any program whose broadcasting time has been changed can be received correctly from its start.

What is claimed is:

1. In a CATV terminal unit for receiving plural signals and selecting from among said plural signals selected signals for viewing or recording, the improvement comprising:
    means for entering into said terminal unit program number data representing a program signal to be viewed or recorded;
    receiving means for receiving said plural signals from a head end station, said plural signals representing TV programs, and selected ones of said signals including timer start commands at the start of a TV program; and
    means responsive to said timer start command, which identifies a program number entered into said terminal unit, for providing power for recording or viewing said program corresponding to said program number and for selecting from said plural signals the signal corresponding to said program number.

2. A CATV terminal unit as claimed in claim 1, wherein said timer start commands include channel information representing the channel carrying the program, and wherein said last named means comprises means for selecting the channel corresponding to the channel information in said start command.

3. A CATV terminal unit as claimed in claim 2, wherein said selected ones of said plural signals further include timer end commands identifying a program number, said end commands occurring at the end of a program so identified; and wherein said terminal unit further comprises,
    means responsive to a timer end command for turning off the power for program recording or viewing, if the program number identified in said end command matches the program number entered into said terminal unit.

4. A TV receiver system comprising:
    means for entering an identified program as an identification of a selected program to be broadcast in the future; and
    means responsive to receipt of said identified program for initiating a comparison of said identified program with said selected program and for turning on the power of said TV and selecting the appropriate channel of said TV to permit viewing of said program.

5. A TV receiver system as claimed in claim 4, further comprising means for turning off the power to said TV at the termination of reception of said program based on said comparison.

6. A CATV head end system of the type which transmits multiple TV programs on selected frequency channels and data signals, the improvement comprising:
    means for generating, for at least a selected program, a timer start command which includes data signals representing the start of said selected program, the identification of said selected program, and the frequency channel of transmission of said selected program; and
    means for transmitting through a uni-directional link said timer start command as a data signal from said head end in time with the start of transmission of said selected program;
    said CATV head end system further comprising means for generating, for at least said selected program, a timer end command which includes data signals representing the end of said selected program and the identification of said selected program; and
    means for transmitting through a uni-directional link said timer end command as a data signal from said head end in time with the end of transmission of said selected program.

7. A CATV System of the type which transmits from a head end to terminal units multiple TV programs on selected frequency channels and data signals, comprising:
    means at said head end for generating, for at least a selected program, a timer start command which includes data signals representing the start of said selected program, the identification of said selected program, and the frequency channel of transmission of said selected program; and
    means for transmitting through a uni-directional link said timer start command as a data signal from said head end in time with the start of transmission of said selected program;
    program timer control means at said terminal unit for entering into said terminal unit a program number code identifying a program to be automatically accessed by said terminal unit; and
    means responsive to receipt from said head end of said timer start command for accessing the program identified by said timer start command if it corresponds to said program number code entered in said terminal unit.

8. A CATV system as claimed in claim 7, further comprising:
    means for generating, for at least said selected program, a timer end command which includes data signals representing the end of said selected program and the identification of said selected program;
    means for transmitting through a unidirectional link said timer end command as a data signal from said head end in time with the end of transmission of said selected program; and
    means responsive to receipt from said head end of said timer end command for terminating access to the program identified by said timer start command if it corresponds to a program number code entered in said terminal unit.

* * * * *